(12) United States Patent
Cerny et al.

(10) Patent No.: US 11,907,105 B2
(45) Date of Patent: *Feb. 20, 2024

(54) BACKWARD COMPATIBILITY TESTING OF SOFTWARE IN A MODE THAT DISRUPTS TIMING

(71) Applicant: Sony Interactive Entertainment LLC, San Mateo, CA (US)

(72) Inventors: Mark Evan Cerny, Los Angeles, CA (US); David Simpson, Los Angeles, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 132 days.

This patent is subject to a terminal disclaimer.

(21) Appl. No.: 17/353,675

(22) Filed: Jun. 21, 2021

(65) Prior Publication Data

US 2021/0311856 A1    Oct. 7, 2021

Related U.S. Application Data

(63) Continuation of application No. 15/967,246, filed on Apr. 30, 2018, now Pat. No. 11,042,470, which is a
(Continued)

(51) Int. Cl.
*G06F 11/36* (2006.01)
*G06F 9/30* (2018.01)
(Continued)

(52) U.S. Cl.
CPC ........ *G06F 11/3668* (2013.01); *G06F 9/3001* (2013.01); *G06F 9/30079* (2013.01);
(Continued)

(58) Field of Classification Search
None
See application file for complete search history.

(56) References Cited

U.S. PATENT DOCUMENTS

| 4,947,366 A | 8/1990 | Johnson |
| 5,790,838 A | 8/1998 | Irish et al. |

(Continued)

FOREIGN PATENT DOCUMENTS

| CN | 103620555 A | 3/2014 |
| CN | 104049948 A | 9/2014 |

(Continued)

OTHER PUBLICATIONS

Extended European Search Report dated Nov. 5, 2021 for European Patent Application EP21176355.2.
(Continued)

*Primary Examiner* — Abu Zar Ghaffari
(74) *Attorney, Agent, or Firm* — JDI PATENT; Joshua D. Isenberg; Robert Pullman

(57) ABSTRACT

A device having a Graphics Processing Unit (GPU) may be configured to selectively run in a normal mode or a timing testing mode. In the timing testing mode the device is configured to disrupt timing of processing that takes place on the GPU while running an application with the GPU and test the application for errors in device hardware component and/or software component synchronization while the device is running in the timing testing mode.

18 Claims, 5 Drawing Sheets

Related U.S. Application Data continuation of application No. PCT/US2016/059751, filed on Oct. 31, 2016, which is a continuation of application No. 14/930,408, filed on Nov. 2, 2015, now Pat. No. 9,892,024.

(51) Int. Cl.
| | | |
|---|---|---|
| *G06F 12/08* | (2016.01) | |
| *G06F 12/084* | (2016.01) | |
| *G06F 12/0875* | (2016.01) | |
| *G06F 12/1045* | (2016.01) | |
| *G06F 9/46* | (2006.01) | |
| *G06F 12/0811* | (2016.01) | |
| *G06F 12/1027* | (2016.01) | |

(52) U.S. Cl.
CPC ............ *G06F 9/46* (2013.01); *G06F 11/3684* (2013.01); *G06F 11/3688* (2013.01); *G06F 12/084* (2013.01); *G06F 12/0875* (2013.01); *G06F 12/1045* (2013.01); *G06F 12/0811* (2013.01); *G06F 12/1027* (2013.01); *G06F 2212/452* (2013.01); *G06F 2212/50* (2013.01); *G06F 2212/62* (2013.01)

(56) References Cited

U.S. PATENT DOCUMENTS

| | | | |
|---|---|---|---|
| 5,940,858 | A | 8/1999 | Green |
| 6,003,142 | A | 12/1999 | Mori |
| 6,138,225 | A | 10/2000 | Upton et al. |
| 6,289,472 | B1 | 9/2001 | Antheunisse et al. |
| 6,363,471 | B1 | 3/2002 | Meier et al. |
| 6,370,589 | B1 * | 4/2002 | Sieber ................ G06F 11/3688 719/330 |
| 6,536,034 | B1 | 3/2003 | Nassor |
| 6,622,298 | B1 | 9/2003 | Stamm |
| 7,046,245 | B2 | 5/2006 | Cerny et al. |
| 7,054,272 | B1 | 5/2006 | Noel et al. |
| 7,055,006 | B1 * | 5/2006 | Kelsey ................ G06F 11/3648 711/138 |
| 7,081,893 | B2 | 7/2006 | Cerny |
| 7,103,757 | B1 | 9/2006 | Kashyap |
| 7,124,404 | B1 | 10/2006 | Bebout et al. |
| 7,739,470 | B1 | 6/2010 | Norgren |
| 7,786,993 | B2 | 8/2010 | Cerny et al. |
| 8,031,192 | B2 | 10/2011 | Cerny |
| 8,149,242 | B2 | 4/2012 | Langyel et al. |
| 8,174,527 | B2 | 5/2012 | Cerny et al. |
| 9,330,786 | B2 | 5/2016 | Uetake et al. |
| 9,330,792 | B2 | 5/2016 | Zhang et al. |
| 9,530,174 | B2 * | 12/2016 | Vaishampayan ........ G06F 1/206 |
| 9,892,024 | B2 | 2/2018 | Cerny et al. |
| 2002/0170003 | A1 | 11/2002 | Hirabayashi |
| 2003/0018682 | A1 | 1/2003 | Katayama |
| 2003/0112238 | A1 | 6/2003 | Cerny et al. |
| 2003/0112240 | A1 | 6/2003 | Cerny |
| 2004/0148548 | A1 | 7/2004 | Moyer et al. |
| 2006/0001674 | A1 | 1/2006 | Cerny et al. |
| 2006/0190794 | A1 | 8/2006 | Murata |
| 2006/0248247 | A1 | 11/2006 | Stewart et al. |
| 2006/0253716 | A1 | 11/2006 | Dhiman et al. |
| 2006/0253741 | A1 * | 11/2006 | Garakani ............ G06F 11/3692 714/38.11 |
| 2006/0253749 | A1 | 11/2006 | Alderegula et al. |
| 2007/0002049 | A1 | 1/2007 | Cerny |
| 2009/0002380 | A1 | 1/2009 | Langyel et al. |
| 2009/0003424 | A1 | 1/2009 | Waayers et al. |
| 2009/0089616 | A1 | 4/2009 | Chen et al. |
| 2009/0199138 | A1 | 8/2009 | Bell et al. |
| 2010/0283783 | A1 | 11/2010 | Cerny et al. |
| 2011/0219277 | A1 | 9/2011 | Jen et al. |
| 2011/0221279 | A1 * | 9/2011 | Ratnaparkhi ....... H02M 5/4585 307/151 |
| 2011/0276550 | A1 | 11/2011 | Colle et al. |
| 2012/0290820 | A1 | 11/2012 | Olson et al. |
| 2012/0304171 | A1 | 11/2012 | Joshi et al. |
| 2012/0311309 | A1 | 12/2012 | Fillipi et al. |
| 2013/0086324 | A1 | 4/2013 | Soundararajan et al. |
| 2013/0179865 | A1 | 7/2013 | Neumeyer et al. |
| 2013/0247008 | A1 | 9/2013 | Mitran et al. |
| 2014/0025891 | A1 | 1/2014 | McCormack et al. |
| 2014/0062974 | A1 * | 3/2014 | Panvelwala ........... G06F 3/1446 345/1.3 |
| 2014/0089699 | A1 * | 3/2014 | O'Connor .............. G09G 5/363 713/300 |
| 2014/0281398 | A1 | 9/2014 | Rash et al. |
| 2014/0281399 | A1 | 9/2014 | Rash et al. |
| 2014/0362081 | A1 | 12/2014 | Cerny et al. |
| 2014/0362100 | A1 | 12/2014 | Cerny et al. |
| 2014/0362101 | A1 | 12/2014 | Cerny et al. |
| 2014/0362102 | A1 | 12/2014 | Cerny et al. |
| 2014/0380325 | A1 | 12/2014 | Hosoki |
| 2015/0039833 | A1 | 2/2015 | Chang et al. |
| 2015/0082090 | A1 | 3/2015 | Holden |
| 2015/0287158 | A1 | 10/2015 | Cerny et al. |
| 2015/0287166 | A1 | 10/2015 | Cerny |
| 2015/0287167 | A1 | 10/2015 | Cerny |
| 2015/0287230 | A1 | 10/2015 | Cerny |
| 2015/0287232 | A1 | 10/2015 | Cerny |
| 2016/0110193 | A1 | 4/2016 | Suga et al. |
| 2016/0162394 | A1 | 6/2016 | Santos et al. |
| 2016/0246323 | A1 | 8/2016 | Cerny et al. |
| 2017/0031732 | A1 | 2/2017 | Cerny et al. |
| 2017/0371798 | A1 * | 12/2017 | Finkler ............... G06F 12/1009 |

FOREIGN PATENT DOCUMENTS

| | | |
|---|---|---|
| CN | 104050012 A | 9/2014 |
| CN | 104704474 A | 6/2015 |
| WO | 2012150970 A1 | 11/2012 |

OTHER PUBLICATIONS

EPC Rule 94(3) Communication dated Apr. 7, 2020 for application No. 16862765.1.
Extended European Search Report dated Apr. 24, 2020 for Patent Application EP20161618.2.
Extended European Search Report dated Jun. 24, 2019 for application No. 16862765.1.
Final Office Action for U.S. Appl. No. 15/927,246, dated May 6, 2020.
Final Office Action for U.S. Appl. No. 14/930,408, dated Apr. 10, 2017.
International Search Report and Written Opinion for International Application No. PCT/US2016/059751, dated Jan. 17, 2017.
Mark Russinovich et al: "Windows Internals Part 16th edition", Mar. 21, 2012 (Mar. 21, 2012), pp. i-276, XP055101190, ISBN: 978-0-73-567131-7Retrieved from the Internet: URL:https://ptgmedia.pearsoncmg.com/images /9780735648739/samplepages/9780735648739.pdf[retrieved on Feb. 10, 2014].
Non-Final Office Action for U.S. Appl. No. 15/967,246, dated Jan. 17, 2020.
Non-Final Office Action for U.S. Appl. No. 15/967,246, dated Oct. 7, 2020.
Non-Final Office Action for U.S. Appl. No. 14/930,408, dated Nov. 22, 2016.
Notice of Allowance for U.S. Appl. No. 15/967,246, dated Feb. 23, 2021.
Office Action dated Oct. 29, 2020 for Chinese patent application No. 201680070684.X.
U.S. Appl. No. 14/627,988, to Mark Evan Cerny, filed Feb. 20, 2015.
U.S. Appl. No. 14/810,334, to Mark Evan Cerny, filed Jul. 27, 2015.
U.S. Appl. No. 14/930,408, to Mark Evan Cerny, filed Nov. 2, 2015.
EPC Rule 94(3) Communication for European Application No. 20161618.2, dated Aug. 17, 2023.

(56) References Cited

OTHER PUBLICATIONS

Chinese Office Action for Chinese Application No. P18D33987D1, dated Oct. 7, 2023.

* cited by examiner

BACKWARD COMPATIBILITY TESTING OF SOFTWARE IN A MODE THAT DISRUPTS TIMING

CLAIM OF PRIORITY

This application is a continuation of U.S. patent application Ser. No. 15/967,246, filed Apr. 30, 2018, the entire contents of which are incorporated herein by reference. U.S. patent application Ser. No. 15/967,246 is a continuation of International Patent Application Number PCT/US2016/059751 filed Oct. 31, 2016, the entire contents of which are incorporated herein by reference. International Patent Application Number PCT/US2016/059751 claims the priority benefit of U.S. patent application Ser. No. 14/930,408 filed Nov. 2, 2015 (now U.S. Pat. No. 9,892,024, Issued Feb. 13, 2018, the entire contents of both of which are incorporated herein by reference.

FIELD OF THE DISCLOSURE

Aspects of the present disclosure are related to execution of a computer application on a computer system. In particular, aspects of the present disclosure are related to a system or a method that provides backward compatibility for applications/titles designed for older versions of a computer system.

BACKGROUND

Modern computer systems often use a number of different processors for different computing tasks. For example, in addition to a number of central processing units (CPUs), a modern computer may have a graphics processing unit (GPU) dedicated to certain computational tasks in a graphics pipeline, or a unit dedicated to digital signal processing for audio, all of which are potentially part of an accelerated processing unit (APU) that may contain other units as well. These processors are connected to memory of various types, using buses that may be internal to an APU or externally located on the computer's motherboard.

It is common that a set of applications are created for a computer system such as a video game console or smartphone (the "legacy device"), and when a variant or a more advanced version of the computer system is released (the "new device") it is desirable for the applications of the legacy device to run flawlessly on the new device without recompilation or any modification that takes into account the properties of the new device. This aspect of the new device, as contained in its hardware architecture, firmware and operating system, is often referred to as "backwards compatibility."

Backwards compatibility is often achieved through binary compatibility, where the new device is capable of executing programs created for the legacy device. However, when the real time behavior of the category of devices is important to their operation, as is in the case of video game consoles or smartphones, significant differences in the speed of operation of a new device may cause it to fail to be backwards compatible with respect to a legacy device. If the new device is of lower performance than the legacy device, issues that prevent backwards compatibility may arise; this is also true if the new device is of higher performance, or has different performance characteristics when compared to the legacy device.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

INTRODUCTION

Figure 1:
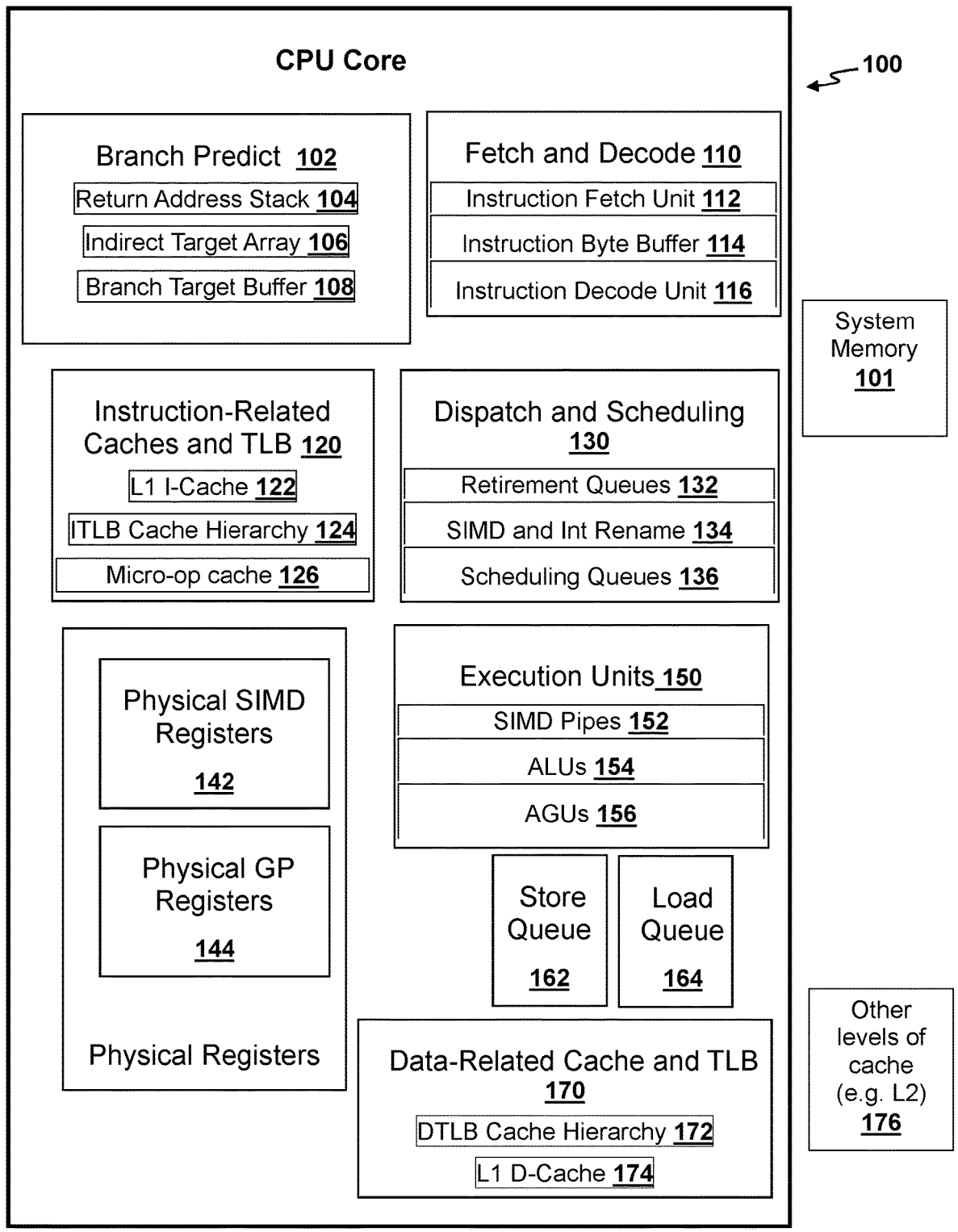
FIG. 1 is a block diagram illustrating an example of a central processing unit (CPU) core that may be configured to operate in a backwards compatibility mode in accordance with aspects of the present disclosure.

Even if the CPUs of the new device are binary compatible with the legacy device (i.e. capable of executing programs created for the legacy device), differences in performance characteristics between the CPUs of the new device and the CPUs of the legacy device may cause errors in legacy applications, and as a result the new device will not be backwards compatible.

If the CPUs of the new device have lower performance than the CPUs of the legacy device, many errors in a legacy application may arise due to the inability to meet real time deadlines imposed by display timing, audio streamout or the like. If the CPUs of the new device have substantially higher performance than the CPUs of the legacy device, many errors in a legacy application may arise due to the untested consequences of such high speed operation. For example, in a producer-consumer model, if a consumer of data (e.g. the CPU) operates at higher speed than originally anticipated, it may attempt to access data before the data producer (e.g. some other component of the computer) makes it available. Alternatively if the producer of the data (e.g. the CPU) operates at higher speed than originally anticipated, it may overwrite data still being used by the data consumer (e.g. some other component of the computer).

Additionally, as speed of execution of code by a CPU depends on the characteristics of the specific code being executed, it is possible that the degree of increase of performance of the CPUs of the new device relative to the legacy device will depend on the specific code being executed. This may lead to problems in the producer-consumer model described above, where producer and consumer are both CPUs but are executing the code of the legacy application at relative speeds not encountered on the legacy hardware.

EMBODIMENTS

Aspects of the present disclosure describe computer systems and methods which may allow applications written for a device to have a higher degree of backwards compatibility when running on a second device that is binary compatible (in that the programs written for the first device will execute on the second device) but has different timing characteristics (in that the programs written for the first device will execute at different rates on the second device, and therefore errors in operation may arise). The second device could potentially be a variant or a more advanced version of the first device, and could potentially be configured in a "backwards compatibility mode" where the features and capabilities of the second device more closely approximate those of the first device.

In implementations of the present disclosure, a timing testing mode is created for the first device. This mode creates timings not found (or not typically found) on the device, with the result that when an application is run in this mode, errors in synchronization between hardware components (such CPU, GPU, audio and video hardware) or between software components (such as application processing or OS processing) occur in ways that are not possible or not common on the device during normal operation. Once these errors in synchronization are detected, the application software may be fixed to eliminate or alleviate them, increasing the likelihood that the application will execute properly on a second device with different timing characteristics, i.e. the application will have a higher degree of backwards compatibility on the second device with respect to the first device. As the capabilities of the second device may not be known (e.g. it may be a future device that does not exist yet), it is of benefit to have a great variety to the timings available in the timing testing mode.

In implementations of the present disclosure, in the timing testing mode, the operating system may configure the hardware in a certain state (e.g. at a specific operating frequency not found in normal operation of the device). Additionally, in the timing testing mode, the operating system may alter the hardware configuration as the application is running, or perform various processing (e.g., processes that compete for system resources or preempt the application processing) as the application is running.

In implementations of the present disclosure, the testing may be performed on hardware different from the device. For example, using ICs selected to run at a greater operating range than a consumer device will allow testing modes not available on the consumer device.

FIG. 1 depicts a generalized architecture of a CPU core 100. The CPU core 100 typically includes a branch prediction unit 102, that attempts to predict whether a branch will be taken or not, and also attempts (in the event that the branch is taken) to predict the destination address of the branch. To the extent that these predictions are correct the efficiency of speculatively executed code will be increased; highly accurate branch prediction is therefore extremely desirable. The branch prediction unit 102 may include highly specialized sub-units such as a return address stack 104 that tracks return addresses from subroutines, an indirect target array 106 that tracks the destinations of indirect branches, and a branch target buffer 108 and its associated prediction logic that track past history of branches in order to more accurately predict their resulting addresses.

The CPU core 100 typically includes an instruction fetch and decode unit 110, which includes an instruction fetch unit 112, an instruction byte buffer 114, and an instruction decode unit 116. The CPU core 100 also typically includes a number of instruction related caches and instruction translation lookaside buffers (ITLBs) 120. These may include an ITLB cache hierarchy 124 that caches virtual address to physical address translation information such as page table entries, page directory entries, and the like. This information is used to transform the virtual address of the instruction into a physical address so that the instruction fetch unit 112 can load the instructions from the cache hierarchy. By way of example, and not by way of limitation, the program instructions may be cached according to a cache hierarchy that includes a level 1 instruction cache (L1 I-Cache) 122 residing in the core, as well as other cache levels 176 external to the CPU core 100; using the physical address of the instruction, these caches are first searched for the program instructions. If the instructions are not found, then they are loaded from a system memory 101. Depending on the architecture, there may also be a micro-op cache 126 that contains the decoded instructions, as described below.

Once the program instructions have been fetched, they are typically placed in the instruction byte buffer 114 awaiting processing by the instruction fetch and decode unit 110. Decoding can be a very complex process; it is difficult to decode multiple instructions each cycle, and there may be restrictions on instruction alignment or type of instruction that limit how many instructions may be decoded in a cycle. Decoded instructions may, depending on architecture, be placed in the micro-op cache 126 (if one is present on the new CPU) so that the decode stage can be bypassed for subsequent use of the program instructions.

Decoded instructions are typically passed to other units for dispatch and scheduling 130. These units may use retirement queues 132 to track the status of the instructions throughout the remainder of the CPU pipeline. Also, due to the limited number of general purpose and SIMD registers available on many CPU architectures, register renaming may be performed, in which as logical (also known as architectural) registers are encountered in stream of instructions being executed, physical registers 140 are assigned to represent them. The physical registers 140 may include Single Instruction Multiple Data (SIMD) register banks 142 and General Purpose (GP) register banks 144, which can be much larger in size than the number of logical registers available on the particular CPU architecture, and as a result the performance can be considerably increased. After register renaming 134 is performed, instructions are typically placed in scheduling queues 136, from which a number of instructions may be selected each cycle (based on dependencies) for execution by execution units 150.

The execution units 150 typically include SIMD pipes 152 that perform a number of parallel operations on multiple data fields contained in 128-bit or wider SIMD registers contained in the SIMD register bank 142, arithmetic and logic units (ALUs) 154 that perform a number of logical, arithmetic, and miscellaneous operations on GPRs contained in the GP register bank 144, and address generation units (AGUs) 156 that calculate the address from which memory should be stored or loaded. There may be multiple instances of each type of execution unit, and the instances may have differing capabilities, for example a specific SIMD pipe 152 may be able to perform floating point multiply operations but not floating point add operations.

Stores and loads are typically buffered in a store queue 162 and a load queue 164 so that many memory operations can be performed in parallel. To assist in memory operations, the CPU core 100 usually includes a number of data related caches and data translation lookaside buffers (DTLBs) 170. A DTLB cache hierarchy 172 caches virtual address to physical address translation such as page table entries, page directory entries, and the like; this information is used to transform the virtual address of the memory operation into a physical address so that data can be stored or loaded from system memory. The data is typically cached in a level 1 data cache (L1 D-Cache) 174 residing in the core, as well as other cache levels 176 external to the core 100.

Figure 2:
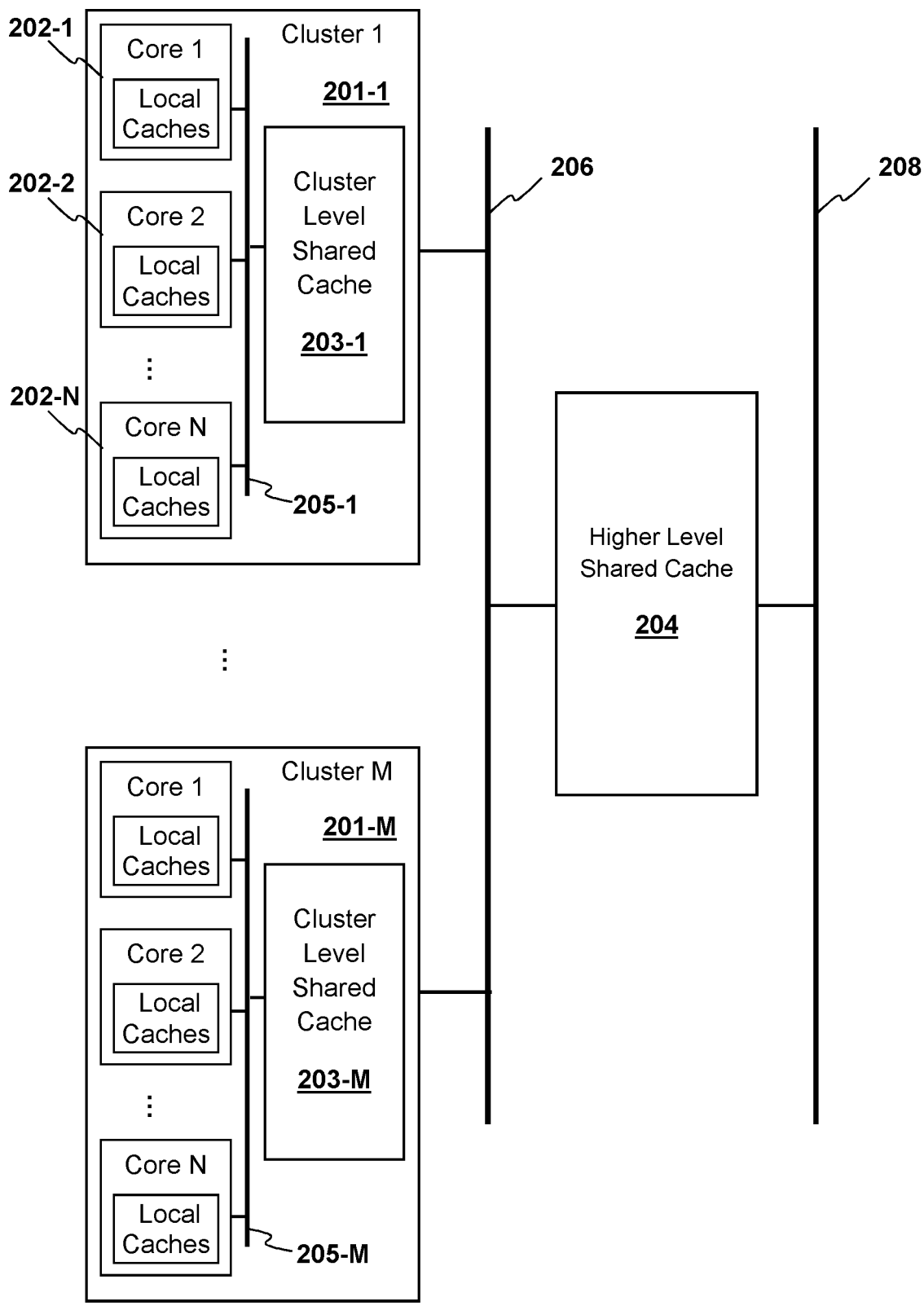
FIG. 2 is a block diagram illustrating an example of a possible multi-core architecture for a CPU in accordance with aspects of the present disclosure.

According to certain aspects of the disclosure, a CPU may include a plurality of cores. By way of example and not by way of limitation, FIG. 2 depicts an example of a possible multi-core CPU 200 that may be used in conjunction with aspects of the present disclosure. Specifically, the architecture of the CPU 200 may include M clusters 201-1 . . . 201-M, where M is an integer greater than zero. Each cluster may have N cores 202-1, 202-2 . . . 202-N, where N is an integer greater than 1. Aspects of the present disclosure include implementations in which different clusters have different numbers of cores. Each core may include one or more corresponding dedicated local caches (e.g., L1 instruction, L1 data, or L2 caches). Each of the local caches may be dedicated to a particular corresponding core in the sense that it is not shared with any other cores. Each cluster may also include a cluster-level cache 203-1 . . . 203-M that may be shared between the cores in the corresponding cluster. In some implementations the cluster-level caches are not shared by cores associated with different caches. Furthermore, the CPU 200 may include one or more higher-level caches 204, which may be shared between the clusters. To facilitate communication among the cores in a cluster, the clusters 201-1 . . . 202-M may include corresponding local busses 205-1 . . . 205-M coupled to each of the cores and the cluster-level cache for the cluster. Likewise, to facilitate communication among the clusters, the CPU 200 may include one or more higher-level busses 206 coupled to the clusters 201-1 . . . 201-M and to the higher level cache 204. In some implementations the higher-level bus or busses 206 may also be coupled to other devices, e.g., a GPU, memory, or memory controller. In still other implementations, the higher-level bus or busses 206 may be connected to a device-level bus that connects to different devices within a system. In yet other implementations, the higher level bus or busses 206 may couple the clusters 201-1 . . . 201-M to the higher level cache 204, and a device-level bus 208 may couple the higher level cache 204 to other devices, e.g., a GPU, memory, or memory controller. By way of example, and not by way of limitation, an implementation with such a device-level bus 208 may arise, e.g., where the higher level cache 204 is an L3 for all CPU cores, but not for GPU use.

In the CPU 200 OS processing may occur predominantly on a certain core, or a certain subset of the cores. Similarly, application-level processing may occur predominantly on a particular core or subset of the cores. Individual application threads may be designated by the application to run on a certain core, or a certain subset of the cores. As caches and busses are shared, speed of processing by a given application thread may vary depending on the processing occurring by other threads (e.g., application threads or OS threads) running in the same cluster as the given application thread. Depending on the specifics of the CPU 200, a core may be capable of executing only one thread at once, or may be capable of executing multiple threads simultaneously ("hyperthreading"). In the case of a hyperthreaded CPU, an application may also designate which threads may be executed simultaneously with which other threads. Performance of a thread is impacted by the specific processing performed by any other threads being executed by the same core.

Figure 3:
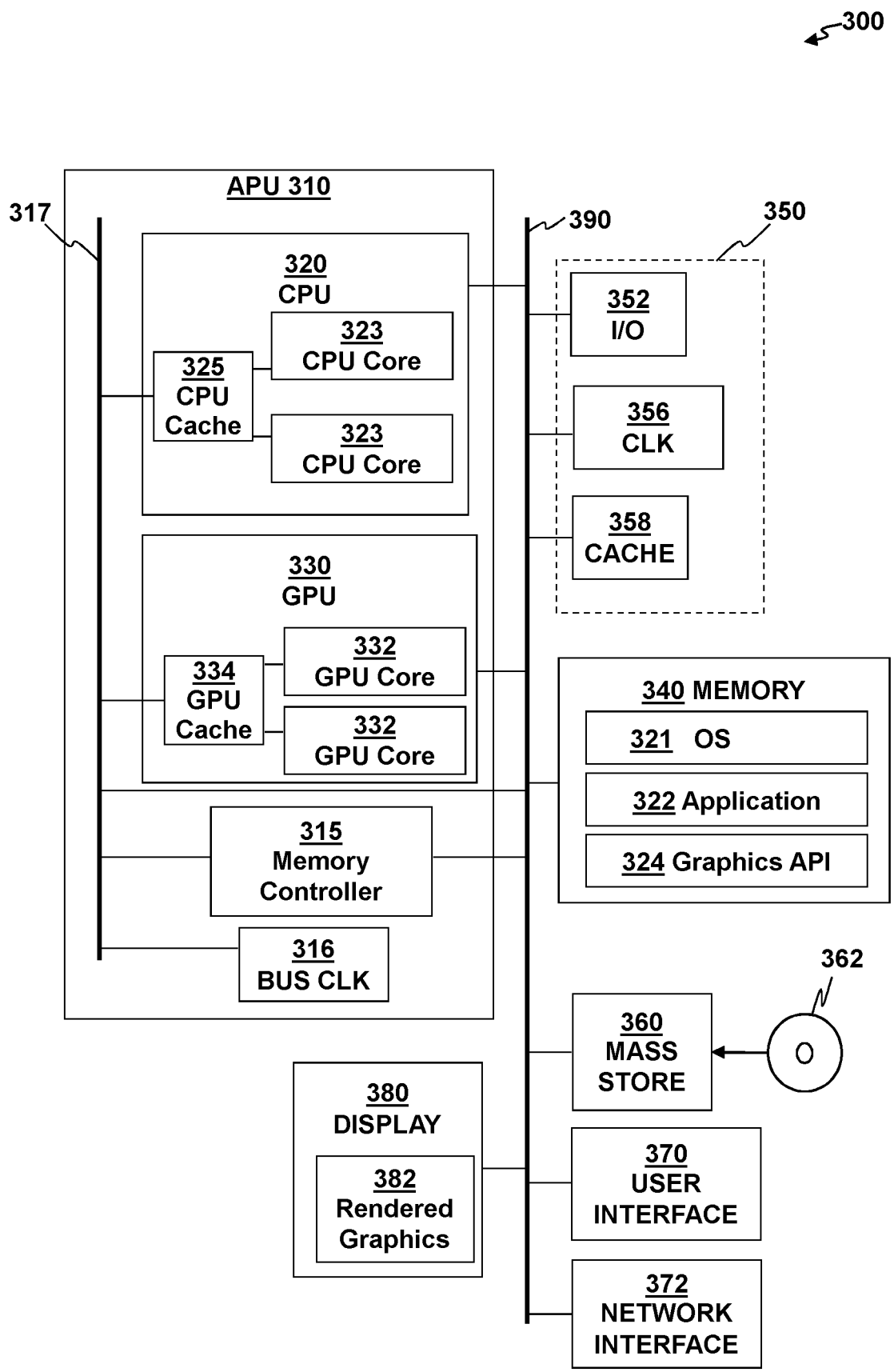
FIG. 3 is a block diagram of a device having a CPU configured to operate in a backwards compatibility mode in accordance with aspects of the present disclosure.

Turning now to FIG. 3, an illustrative example of a device 300 configured to operate in accordance with aspects of the present disclosure is depicted. According to aspects of the present disclosure, the device 300 may be an embedded system, mobile phone, personal computer, tablet computer, portable game device, workstation, game console, and the like.

The device 300 generally includes a central processor unit (CPU) 320 which may include one or more CPU cores 323 of the type depicted in FIG. 1 and discussed above. The CPU 320 may include a plurality of such cores 323 and one or more caches 325 in a configuration like that shown in the CPU 200 of FIG. 2. By way of example and not by way of limitation, the CPU 320 may be part of an accelerated processing unit (APU) 310 that includes the CPU 320, and a graphics processing unit (GPU) 330 on a single chip. In alternative implementations, the CPU 320 and GPU 330 may be implemented as separate hardware components on separate chips. The GPU 330 may also include two or more cores 332 and two or more caches 334 and (in some implementations) one or more busses to facilitate communication among the cores and caches and other components of the system. The busses may include an internal bus or busses 317 for the APU 310, and an external data bus 390.

The device 300 may also include memory 340. The memory 340 may optionally include a main memory unit that is accessible to the CPU 320 and GPU 330. The CPU 320 and GPU 330 may each include one or more processor cores, e.g., a single core, two cores, four cores, eight cores, or more. The CPU 320 and GPU 330 may be configured to access one or more memory units using the external data bus 390, and, in some implementations, it may be useful for the device 300 to include two or more different buses.

Figure 5:
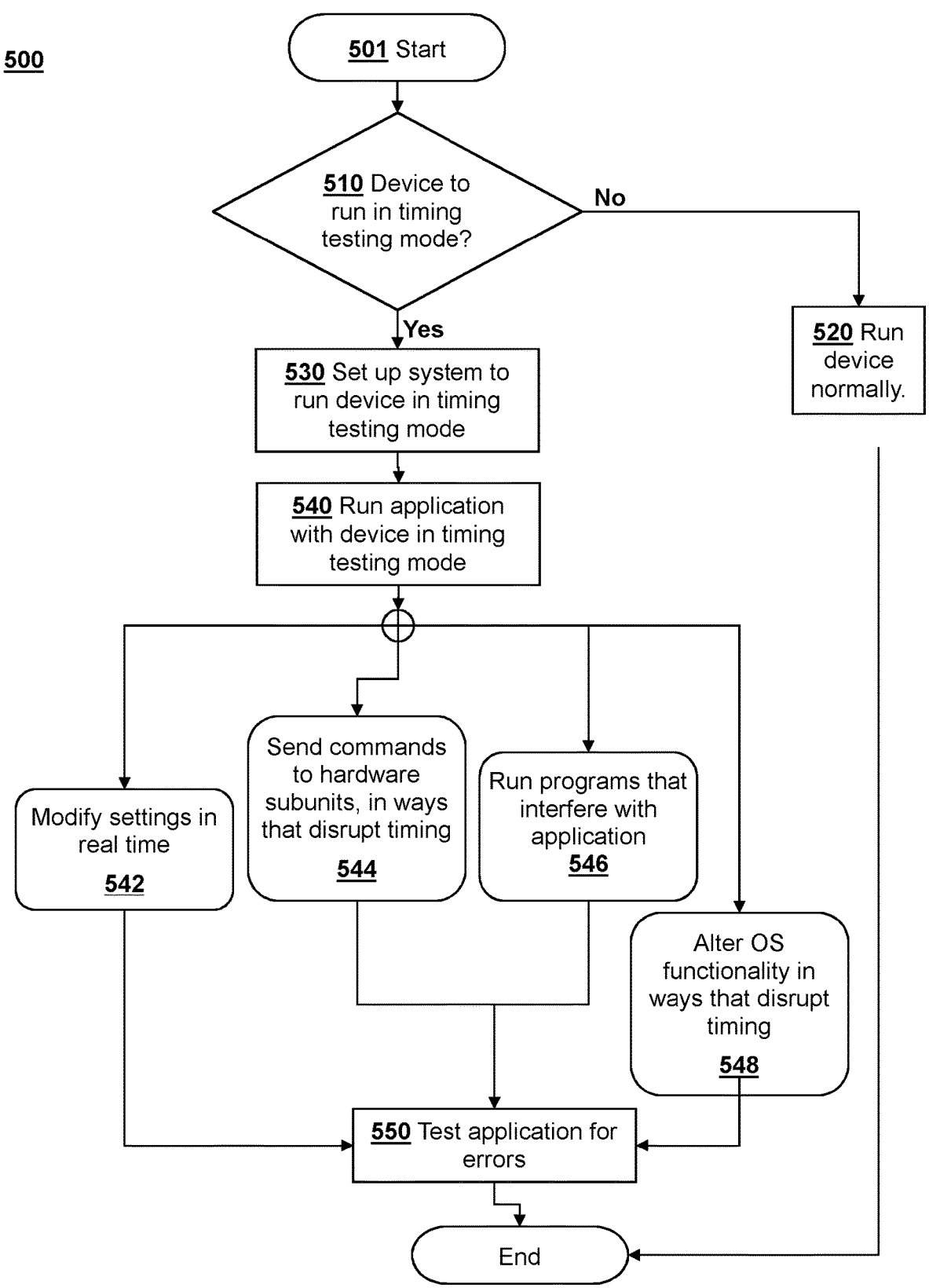
FIG. 5 is a flow diagram that illustrates operation of a device in a timing testing mode in accordance with aspects of the present disclosure.

The memory 340 may include one or more memory units in the form of integrated circuits that provides addressable memory, e.g., RAM, DRAM, and the like. The memory may contain executable instructions configured to implement a method like the method of FIG. 5 upon execution for determining operate the device 300 in a timing testing mode when running applications originally created for execution on a legacy CPU. In addition, the memory 340 may include a dedicated graphics memory for temporarily storing graphics resources, graphics buffers, and other graphics data for a graphics rendering pipeline.

The CPU 320 may be configured to execute CPU code, which may include operating system (OS) 321 or an application 322 (e.g., a video game). The operating system may include a kernel that manages input/output (I/O) requests from software (e.g., application 322) and translates them into data processing instructions for the CPU 320, GPU 330 or other components of the device 300. The OS 321 may also include firmware, which may be stored in non-volatile memory. The OS 321 may be configured to implement certain features of operating the CPU 320 in a timing testing mode, as discussed in detail below. The CPU code may include a graphics application programming interface (API) 324 for issuing draw commands or draw calls to programs implemented by the GPU 330 based on a state of the application 322. The CPU code may also implement physics simulations and other functions. Portions of the code for one or more of the OS 321, application 322, or API 324 may be stored in the memory 340, caches internal or external to the CPU or in a mass storage device accessible to the CPU 320.

The device 300 may include a memory controller 315. The memory controller 315 may be a digital circuit that manages the flow of data going to and from the memory 340. By way of example and not by way of limitation, the memory controller may be an integral part of the APU 310, as in the example depicted in FIG. 3, or may be a separate hardware component.

The device 300 may also include well-known support functions 350, which may communicate with other components of the system, e.g., via the bus 390. Such support functions may include, but are not limited to, input/output (I/O) elements 352, one or more clocks 356, which may include separate clocks for the CPU 320, GPU 330, and memory 340, respectively, and one or more levels of cache 358, which may be external to the CPU 320 and GPU 330. The device 300 may optionally include a mass storage device 360 such as a disk drive, CD-ROM drive, flash memory, tape drive, Blu-ray drive, or the like to store programs and/or data. In one example, the mass storage device 360 may receive a computer readable medium 362 containing a legacy application originally designed to run on a system having a legacy CPU. Alternatively, the legacy application 362 (or portions thereof) may be stored in memory 340 or partly in the cache 358.

The device 300 may also include a display unit 380 to present rendered graphics 382 prepared by the GPU 330 to a user. The device 300 may also include a user interface unit 370 to facilitate interaction between the system 100 and a user. The display unit 380 may be in the form of a flat panel display, cathode ray tube (CRT) screen, touch screen, head mounted display (HMD) or other device that can display text, numerals, graphical symbols, or images. The display 380 may display rendered graphics 382 processed in accordance with various techniques described herein. The user interface 370 may contain one or more peripherals, such as a keyboard, mouse, joystick, light pen, game controller, touch screen, and/or other device that may be used in conjunction with a graphical user interface (GUI). In certain implementations, the state of the application 322 and the underlying content of the graphics may be determined at least in part by user input through the user interface 370, e.g., where the application 322 includes a video game or other graphics intensive application.

The device 300 may also include a network interface 372 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

Aspects of the present disclosure overcome problems with backward compatibility that arise as a result of differences in timing when programs written for a legacy system run on a more powerful or a differently configured new system. By running the device 300 in a timing testing mode developers can determine how software written for legacy systems perform when operated on the new system.

Figure 4:
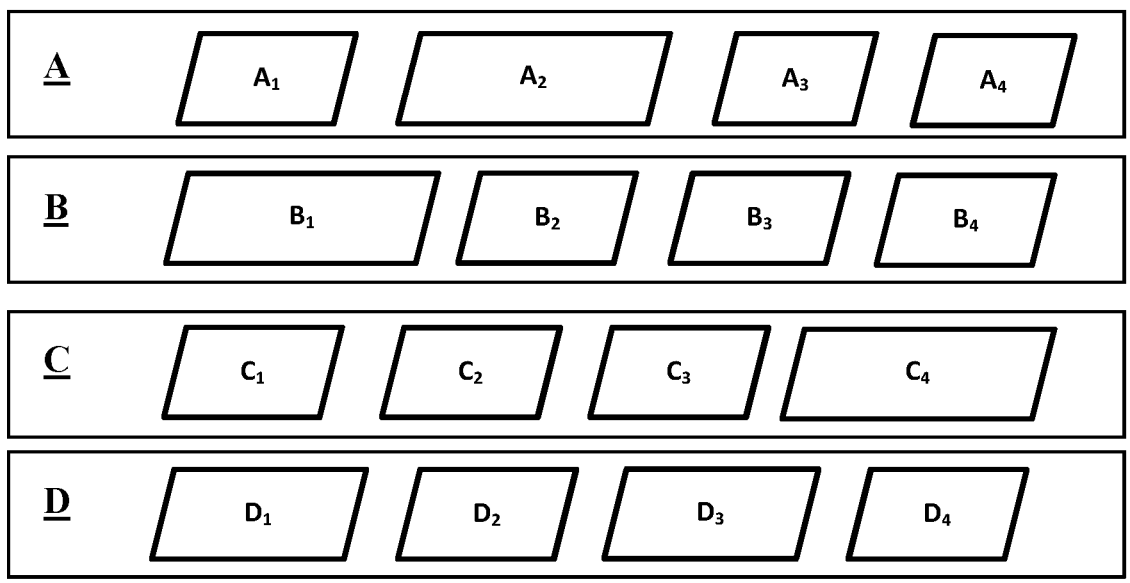
FIG. 4 is a timing diagram that illustrates the concept of "skew".

According to aspects of the present disclosure, the device 300 may be configured to operate in a timing testing mode. To appreciate the usefulness of such a mode of operation, consider the timing diagram of FIG. 4. In FIG. 4, when running an application, different computing elements (e.g., CPU cores) A, B, C, D may run different tasks indicated by the parallelograms $A_1 \ldots A_4$, $B_1 \ldots B_4$, $C_1 \ldots C_4$, $D_1 \ldots D_4$. Certain tasks need to produce data for consumption by other tasks, which can't begin work until the needed data is produced. For example, suppose task $A_2$ requires data produced by task $A_1$, and task $B_2$, requires data produced by tasks $A_1$ and $B_1$. To ensure proper operation, typically the application will use semaphores or other synchronization strategies between the tasks, for example prior to beginning execution of task $B_2$, it should be checked that tasks $A_1$ and $B_1$ (that produce the required source data for task $B_2$) have run to completion. Further suppose that the timing shown in FIG. 4 represents the timing of these tasks as implemented on a legacy device. Timings may differ on a new device (e.g. one with more powerful processing capabilities in core B), and as a result task $B_1$ might finish before task $A_1$ has produced the data need by task $B_2$. The shift in the relative timing of the tasks on the different processors is referred to herein as "skew". Such skew may expose software errors in the application that will appear only on the new device, or appear with increased frequency on the new device. For example, if on the legacy device, task $A_1$ were guaranteed to finish before task $B_2$, the synchronization code ensuring that task $A_1$ finishes before task $B_2$ might never be tested, and if the synchronization code were improperly implemented, it is possible that this would only become known when running the application on the new device, e.g. task $B_2$ might begin execution before task $A_1$ produced the data required my it, potentially leading to a fatal error in the application. Furthermore, similar problems may arise when applications written to be run on a new device are run on a less capable legacy device. To address these problems, a device such as 300 may be run in a timing testing mode in which skew can be deliberately created, e.g., among CPU threads, or between the CPU 320 and GPU 330, or among processes running on GPU 330, or between any of these and real time clocks. Testing in this mode can increase the likelihood that an application will run properly on future hardware.

According to aspects of the present disclosure, in the timing testing mode the CPU cores may be configured to run at different frequencies (higher or lower) than for normal operation of the device, or the OS 321 may continually or occasionally modify the frequencies of the CPU cores. This may be done in such a way that the CPU cores all run at the same frequency relative to each other, or in such a way that the CPU cores run at different frequencies from each other, or some may run at a certain frequency and others at another frequency.

By way of example, but not by way of limitation, if on a legacy device there are four cores that run at 1 GHz on a consumer device in its typical operating mode, then in timing testing mode, during successive ten second periods, a core may be selected randomly to run at 800 MHz. As a result, processes running on the selected core would run more slowly, exposing possible errors in synchronization logic between that core and the other cores, as other cores might attempt to use data prepared by the selected core before that data was fully ready.

In aspects of the current disclosure, in timing testing mode a clock rate of caches not contained in the CPU cores may be configured to run at a different (higher or lower) frequency than their normal operating frequency, or different than the normal operating frequency of the CPU cores. If there are multiple caches that may be configured in such a way, then they may be configured to run at the same rate relative to each other, at different frequencies relative to each other, or some may run at a certain frequency and others at another frequency.

In aspects of the current disclosure, in timing testing mode CPU resources may be configured to be restricted in ways that affect the timing of execution of application code. Queues, e.g., store and load queues, retirement queues, and scheduling queues, may be configured to be reduced in size (e.g., the usable portion of the resource may be restricted). Caches, such as the L1 I-Cache and D-Cache, the ITLB and DTLB cache hierarchies, and higher level caches may be reduced in size (e.g. the number of values that can be stored in a fully associative cache may be reduced, or for a cache with a limited number of ways the available bank count or way count may be reduced). The rate of execution of all instructions or specific instructions running on the ALU, AGU or SIMD pipes may be reduced (e.g. the latency increases and/or the throughput decreases).

In aspects of the current disclosure, in timing testing mode the OS may temporarily preempt (suspend) application threads. By way of example, but not by way of limitation, individual application threads may be preempted, or multiple threads may be preempted simultaneously, or all threads may be preempted simultaneously; the timing of the preemption can be random or systematic; the number of preemptions and their length may be tuned so as to increase the likelihood that real time deadlines (such as for display timing or audio streamout) can be met by the application.

In aspects of the current disclosure, in timing testing mode, when the OS performs processing as requested by the application (e.g. services such as allocation), or when the OS performs processing independent of application requests (e.g. servicing of hardware interrupts), the time taken by the OS and a processor (e.g., a CPU core) used by the OS may be different from the time taken and the CPU core used in the normal mode of operation of the device. By way of example, but not by way of limitation, the time taken by the OS to perform memory allocation could be increased, or the OS could service hardware interrupts using CPU cores that are exclusively used by the application under normal operation of the device.

In aspects of the current disclosure, in timing testing mode, the application threads may execute on a CPU core different from that designated by the application. By way of example, but not by way of limitation, in an system with two clusters (cluster "A" and cluster "B") each with two cores, all threads designated for execution on core 0 of cluster A could instead by executed on core 0 of cluster B, and all threads designated for execution on core 0 of cluster B could instead by executed on core 0 of cluster A, resulting in different timing of execution of thread processing due to sharing the cluster high level cache with different threads than under normal operation of the device.

In aspects of the current disclosure, in timing testing mode, the OS 321 may randomly or systematically write back or invalidate CPU caches, or invalidate instruction and data TLBs. By way of example, but not by way of limitation, the OS could randomly invalidate and write back the cache hierarchy of all CPU cores, resulting in delays in thread execution during the invalidation and write back, as well as delays as threads request data normally found in the cache hierarchy, resulting in timing not encountered during normal operation of the device.

In aspects of the current disclosure, in timing testing mode the GPU and any GPU subunits with separate configurable frequencies may be configured to run at different frequencies from normal operation of the device, or the OS may continually or occasionally modify the frequency of the GPU and any of its separately configurable subunits.

In addition, other behaviors of one or more caches, such as the L1 I-Cache and D-Cache, the ITLB and DTLB cache hierarchies, and higher level caches may be modified in ways the disrupt timing in the timing testing mode. One non-limiting example of such a change in cache behavior modification would be to change whether a particular cache is exclusive or inclusive. A cache that is inclusive in the normal mode may be configured to be exclusive in the timing testing mode or vice versa.

Another non-limiting example of a cache behavior modification involves cache lookup behavior. In the timing testing mode, cache lookups may be done differently than in the normal mode. Memory access for certain newer processor hardware may actually slow down compared to older hardware if the newer hardware translates from virtual to physical address before a cache lookup and the older hardware does not. For cache entries stored by physical address, as is commonly done for multi-core CPU caches 325, a virtual address is always translated to a physical address before performing a cache look up (e.g., in L1 and L2). Always translating a virtual address to a physical address before performing any cache lookup allows a core that writes to a particular memory location to notify other cores not to write to that location. By contrast, cache lookups for cache entries stored according to virtual address (e.g., for GPU caches 334) can be performed without having to translate the address. This is faster because address translation only needs to be performed in the event of a cache miss, i.e., an entry is not in the cache and must be looked up in memory 340. The difference in cache behavior between may introduce a delay of 5 to 1000 cycles in newer hardware, e.g., if older GPU hardware stores cache entries by virtual address and newer GPU hardware stores cache entries by physical address. To test the application 322 for errors resulting from differences in cache lookup behavior, in the timing testing mode, caching and cache lookup behavior for one or more caches (e.g., GPU caches 334) may be changed from being based on virtual address to being based on physical address or vice versa.

Yet another, non-limiting, example of a behavior modification would be to disable an I-cache pre-fetch function in the timing testing mode for one or more I-caches that have such a function enabled in the normal mode.

In aspects of the current disclosure, in timing testing mode, in timing testing mode the OS may replace GPU firmware, if it exists, with firmware with timings different from normal operation of the device. By way of example, but not by way of limitation, in timing testing mode the firmware could be replaced by firmware with a higher overhead for each object processed, or by firmware that supports a lower count of objects that can be processed simultaneously, resulting in timing not encountered during normal operation of the device.

In aspects of the current disclosure, in timing testing mode GPU resources may be configured to be restricted in ways that affect the timing of processing of application requests. The GPU caches 334 may be reduced in size (e.g. the number of values that can be stored in a fully associative cache may be reduced, or for a cache with a limited number of ways the available bank count or way count may be reduced). The rate of execution of all instructions or specific instructions running on the GPU cores 332 may be reduced (e.g. the latency increases and/or the throughput decreases).

In aspects of the current disclosure, in timing testing mode the OS 321 may request the GPU 330 to perform processing that reduces that remaining resources available to application 322 for its processing. These requests may be either random or systematic in their timing. By way of example, but not by way of limitation, the OS 321 may request higher priority rendering of graphical objects or compute shaders which may displace lower priority application rendering or other computation, or the OS 321 may request that its processing occur on specific GPU cores 332 and thereby disproportionally impact application processing designated to be occurring on those GPU cores.

In aspects of the current disclosure, in timing testing mode, the OS 321 may randomly or systematically request that the GPU 330 write back or invalidate its caches, or invalidate its instruction and data TLBs.

According to aspects of the present disclosure, the APU 310 may include an internal clock or clocks 316 for the internal bus or busses 317, which operates at a specific clock rate or set of rates referred to herein as the "internal bus clock". The internal bus or busses 317 connects to the memory controller 315, which is in turn connected to the external memory 340. Communications from the memory controller 315 to the memory 340 may occur at another specific clock rate, referred to herein as the "memory clock".

According to aspects of the present disclosure, when the device 300 operates in the timing testing mode the memory clock and/or internal bus clock may be configured to run at different (e.g., higher or lower) frequencies than they run at during normal operation of the device, or the OS 321 may continually or occasionally modify the frequency of the memory clock and/or internal bus clock.

In aspects of the current disclosure, in the timing testing mode the memory controller 315 may be configured to simulate random failures to read data properly from the external memory, to increase the latency of certain types of memory accesses performed by the memory controller, or to use prioritization between the various types of memory accesses that differs from the prioritization used during normal operation of the device. The OS 321 may continually or occasionally modify these configurations in timing testing mode.

According to aspects of the present disclosure, in the timing testing mode the memory controller 315 may be configured so that address lines are permuted, e.g., signals ordinarily placed on one address line may be swapped with signals placed on another address line. By way of example, but not by way of limitation, if address line A was used to send column information to external memory 315, and address line B was used to send row information to the external memory 340, and in timing testing mode the signals sent to address lines A and B were swapped, then the result would be very different timing than that found during normal operation of the device.

Configuring the hardware and performing operations as described above (e.g., configuring the CPU cores to run at different frequencies) may expose errors in synchronization logic, but if the real time behavior of the device is important, the timing testing mode itself may cause errors in operation, e.g., in the case of a video game console, errors due to the inability of the lower speed CPU cores to meet real time deadlines imposed by display timing, audio streamout or the like. According to aspects of the present disclosure, in timing testing mode, the device 300 may be run at higher than standard operating speed. By way of non-limiting example, the higher than standard operating speed may be about 5% to about 30% higher than the standard operating speed. By way of example, but not by way of limitation, in timing testing mode, the clock of the CPU, CPU caches, GPU, internal bus, and memory may be set to higher frequencies than the standard operating frequency (or the standard operating frequency range) of the device. As the mass produced version of the device 300 may be constructed in such a way as to preclude setting of clocks at above standard operating frequencies, specially designed hardware may need to be created, for example hardware that uses higher speed memory chips than a corresponding mass produced device, or uses the portion of a manufacturing run of a system on chip (SoC) that allows higher speed operation than average, or uses higher spec motherboards, power supplies, and cooling systems than are used on the mass produced device.

By way of example, but not by way of limitation, if the specially designed hardware allows higher speed operation of the CPU than the mass produced device does, and if there are four cores that run at 1 GHz on the mass produced device in its typical operating mode, then in timing testing mode on the specially designed hardware, during successive ten second periods, three cores could be selected to run at 1.2 GHz, and the remaining core could run at 1 GHz. As a result, processing running on the selected core would run more slowly than on the other cores, exposing possible errors in synchronization logic, but unlike the prior example as all cores are running at least as fast as they do on the mass produced device, real time deadlines (e.g. for display timing) can be met and the timing testing mode itself is unlikely to cause errors in operation.

By way of example, but not by way of limitation, if the specially designed hardware allows higher speed operation of the CPU than the mass produced device does, and if there are four cores that run at 1 GHz on the mass produced device in its typical operating mode, then in timing testing mode on the specially designed hardware, all cores could be selected to run at 1.2 GHz, and the OS 321 may randomly write back and invalidate CPU caches. If the degree of slowdown due to the cache write back and invalidation is less than the speedup due to the higher CPU frequency, then as above real time deadlines can be met and the timing testing mode itself is unlikely to cause errors in operation, in other words the timing testing mode can induce skew via the cache operations and testing for synchronization errors can be performed without concern that the overall operation of the device will be slower and therefore more error-prone.

There are a number of ways in which application errors may be manifested in the timing testing mode. According to one implementation, the specially designed hardware may include a circuit or circuits configured to determine the number of instructions per cycle (IPC) executed by the device 300. The OS 321 may monitor changes in IPC to test for errors in the application. The OS may correlate significant variations in IPC to particular modifications to operation of the device in timing testing mode.

According to aspects of the present disclosure a computer device may operate in a timing testing mode. By way of example, and not by way of limitation, a computer system, like the device 300 may have an operating system, like the operating system 321 that is configured to implement such a timing testing mode in a manner similar to a method 500 illustrated in FIG. 5 and discussed below.

The method starts, as indicated at 501. At 510, it is determined whether the system is to run in timing testing mode. There are a number of ways in which this may be done. By way of example, and not by way of limitation, the operating system 321 may prompt a user to determine whether to enter the timing testing mode via rendered graphics 382 on the display 380 and the user may enter an appropriate instruction via the user interface 370. If it is determined that the system should not operate in the timing testing mode, the system may run normally, as indicated at 520. If it is determined that the system should operate in the timing testing mode, the device may be set run in the timing testing mode, as indicated at 530. Setting up the device to run in the timing testing mode may generally involve an operating system for the device (e.g., OS 321) setting up a hardware state, loading firmware, and performing other operations to implement settings that are specific to the timing testing mode.

The device 300 may be set to run in the timing testing mode in any of a large number of possible ways. By way of example, and not by way of limitation, in some implementations the device may be configured externally, e.g., via a network (e.g., a local area network (LAN). In another non-limiting example, the device may be configured internally through the use of menus generated by the operating system and inputs from a user interface. In other non-limiting example, the device may be set up to run in the timing testing mode through physical configuration of the device hardware, e.g., by manually setting the positions of one or more dual in-line package (DIP) switches on the device. The device firmware (e.g., stored in ROM) may then read the settings of the DIP switches, e.g., when the device is powered on. This latter implementation may be useful, e.g., in cases where the device is specially designed hardware rather than the mass produced version of the device. In such cases, the switches may be located on an outside of a box or case that contains the device hardware for convenience.

Once the device is set run in the timing testing mode, the device may run an application in the timing testing mode, as indicated at 540. There are a number of ways in which the operation of the system in timing testing mode may differ from normal device operation.

By way of example, and not by way of limitation, while the application 322 is running, the OS 321 may do one or more of the following while running the application in the timing testing:
  Modifying hardware settings in real time, as indicated at 542;
  Sending commands to various hardware components of the device 300, in ways that disrupt timing, as indicated at 544;
  Running programs that interfere with the application 322, e.g., by taking resources away from application, suspending the application, or competing for resources with the application, as indicated at 546.
  altering functionality of the OS 321 in the timing testing mode in ways that disrupt timing, as indicated at 548.

Once the application 322 is running with the device 300 in the timing testing mode, the application may be tested for errors, as indicated at 550. Such testing may include, but is not limited to, determining whether the application stalls, generates an error, or produces an anomalous result (e.g., a significant IPC variation) that does not occur when the device runs normally.

As an example of modifying settings at 542, in a processor architecture of the type shown in FIG. 2, two or more CPU cores may run at different frequencies, which may be frequencies higher than then normal operating frequency of the consumer device. Similarly, two or more caches within a device may run at different frequencies in the timing testing mode. Furthermore, different combinations of cores and caches may run at different frequencies.

In other embodiments, CPU resources may be reduced when the device operates in the timing testing mode. Examples of such CPU resource reduction include, but are not limited to reducing the size of store queues, load queues, or caches (e.g., L1 or higher, I-cache, D-cache, ITLB, or DTLB). Other examples include, but are not limited to reducing the rate of execution of ALU, AGU, SIMD pipes, or specific instructions. In addition, one or more individual cores or application threads may be randomly or systematically preempted. Additional examples include delaying or speeding up or changing timing when using OS functionality, changing use of cores by the OS, altering virtual to physical core assignment (e.g., inter-cluster competition), leveraging other asymmetries, or writing back or invalidating caches and/or TLBs.

In other implementations, modifying settings at 542 may include altering the functioning of the GPU 330. Examples of such alterations include running GPU cores 332 at different frequencies, running one or more of the GPU cores at a different frequency than normal for a consumer device, replacing GPU firmware with firmware with timings different from normal operation of the device 300. One more of the GPU cores 332 may be configured to selectively operate at higher or lower frequencies than are used for the normal operating mode of the device. Other examples include disrupting GPU firmware (e.g., disrupting object processing), and reducing GPU resources reduced such as cache size or rate of execution.

In other implementations, GPU processing may be altered when running the device in the timing testing mode, e.g., by changing wavefront count via random compute threads, randomly preempting graphics, or by writing back or invalidating caches and/or TLBs.

Examples of sending commands to hardware components in ways that disrupt timing at 544 include altering the functioning of the memory 340 or memory controller 315. Examples of such alteration of memory or memory controller functioning include, but are not limited to, running a memory clock/and internal bus clock different frequencies, inserting noise into memory operations, adding latency to memory operations, changing priorities of memory operations, and changing row and/or column channel bits, to simulate different channel counts or row breaks.

Aspects of the present disclosure allow software developers to test out the performance of new applications on previous versions of a device. More specifically, aspects of the present disclosure allow developers to probe effects of disruptions in timing on the application.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. As used herein, in a listing of elements in the alternative, the term "or" is used as the inclusive sense, e.g., "X or Y" covers X alone, Y alone, or both X and Y together, except where expressly stated otherwise. Two or more elements listed as alternatives may be combined together. The appended claims are not to be interpreted as including means-plus-function limitations, unless such a limitation is explicitly recited in a given claim using the phrase "means for."

What is claimed is:
1. A device, comprising:
  one or more processors including a graphics processing unit (GPU) and a central processing unit (CPU) core;
  a memory coupled to the one or more processors; and
  an operating system (OS) stored in the memory configured to run on at least a subset of the one or more processors including the CPU core, wherein the operating system is configured to selectively run in a normal mode or a timing testing mode, wherein in the timing testing mode the device is configured to disrupt timing of processing that takes place on the GPU while running an application with the GPU and testing the application for errors in device hardware components synchronization and/or software components synchronization while the device is running in the timing testing mode, wherein disrupting the timing of processing that takes place on the GPU while running an application with the GPU includes the OS replacing the firmware of GPU.

2. The device of claim 1, wherein the OS modifies the frequency of at least one GPU subunit.

3. The device of claim 2, wherein the OS continually modifies the frequency of at least one GPU subunit.

4. The device of claim 1, wherein disrupting the timing of processing that takes place on the GPU while running an application with the GPU includes the OS replacing the firmware of GPU with a firmware that has higher overhead for each object processed.

5. The device of claim 1, wherein disrupting the timing of processing that takes place on the GPU while running an application with the GPU includes the OS replacing the firmware of GPU with a firmware that supports a lower count of objects that can be processed simultaneously than the normal firmware.

6. The device of claim 1, wherein disrupting the timing of processing that takes place on the GPU while running an application with the GPU includes reducing a size of a GPU cache.

7. The device of claim 1, wherein disrupting the timing of processing that takes place on the GPU while running an application with the GPU includes reducing a rate of execution of all instructions or specific instructions running on the GPU.

8. The device of claim 1, wherein disrupting the timing of processing that takes place on the GPU while running an application with the GPU includes the OS requesting the GPU to perform other processing tasks that reduce the remaining resources available to the application.

9. The device of claim 8, wherein the OS requests the GPU to perform the other processing tasks at random times while running the application.

10. The device of claim 8, wherein the OS requests the GPU to perform rendering of graphical objects or compute shaders at a higher priority than the application while running the application.

11. The device of claim 8, wherein the OS requests the GPU to process the application on specific cores.

12. The device of claim 1, wherein the disrupting the timing of processing that takes place on the GPU while running an application with the GPU includes the OS requesting the GPU to write back or invalidate GPU caches.

13. The device of claim 1, wherein the disrupting the timing of processing that takes place on the GPU while running an application with the GPU includes the OS requesting the GPU to writeback or invalidate GPU Instruction Translation Lookaside Buffers (ITLBs).

14. The device of claim 1, wherein the disrupting the timing of processing that takes place on the GPU while running an application with the GPU includes the OS requesting the GPU to write back or invalidate GPU Data Translation Lookaside Buffers (DTLBs).

15. A device, comprising:
one or more processors including a graphics processing unit (GPU) and a central processing unit (CPU) core;
a memory coupled to the one or more processors; and
an operating system (OS) stored in the memory configured to run on at least a subset of the one or more processors including the CPU core, wherein the operating system is configured to selectively run in a normal mode or a timing testing mode, wherein in the timing testing mode the device is configured to disrupt timing of processing that takes place on the GPU while running an application with the GPU and testing the application for errors in device hardware components synchronization and/or software components synchronization while the device is running in the timing testing mode, wherein disrupting the timing of processing that takes place on the GPU while running an application with the GPU changing the GPU caching behavior and GPU cache lookup behavior from being based on a virtual address to being based on a physical address.

16. A device, comprising:
one or more processors including a graphics processing unit (GPU) and a central processing unit (CPU) core;
a memory coupled to the one or more processors; and
an operating system (OS) stored in the memory configured to run on at least a subset of the one or more processors including the CPU core, wherein the operating system is configured to selectively run in a normal mode or a timing testing mode, wherein in the timing testing mode the device is configured to disrupt timing of processing that takes place on the GPU while running an application with the GPU and testing the application for errors in device hardware components synchronization and/or software components synchronization while the device is running in the timing testing mode, wherein disrupting the timing of processing that takes place on the GPU while running an application with the GPU includes changing the GPU caching behavior and GPU cache lookup behavior from being based on a physical address to being based on a virtual address.

17. A device, comprising:
a Graphics Processing Unit (GPU);
a Central Processing Unit (CPU) Core;
an operating system (OS) configured to run on at least a subset of the one or more processors including the CPU core, wherein the device is configured to selectively run in a normal mode or a timing testing mode with the CPU core, wherein in the timing testing mode the device is configured to disrupt timing of processing that takes place on the GPU while running an application with the GPU and testing the application for errors in device hardware component synchronization and/or software component synchronization while the device is running in the timing testing mode, wherein disrupting the timing of processing that takes place on the GPU while running an application with the GPU includes the OS replacing firmware of the GPU.

18. A non-transitory computer readable medium having computer readable executable instructions embodied therein, the instructions being configured to cause a device having a Graphics Processing Unit (GPU) to implement a method upon execution of the instructions, the method comprising:
running the device in a timing testing mode with a Central Processing Unit (CPU) core, wherein in the timing testing mode the device is configured to disrupt timing of processing that takes place on the GPU while running an application with the GPU; and testing the application for errors in device hardware component synchronization and/or software component synchronization while the device is running in the timing testing mode, wherein disrupting the timing of processing that takes place on the GPU while running an application with the GPU includes an operating system (OS) replacing firmware of the GPU.

* * * * *